Dec. 31, 1968  A. G. POIRIER  3,419,234
AIRCRAFT RESCUE SYSTEM
Filed Sept. 19, 1967  Sheet 1 of 4

INVENTOR.
ALFRED G. POIRIER.
BY James N. Lyler
John H. Oltman
ATT'YS.

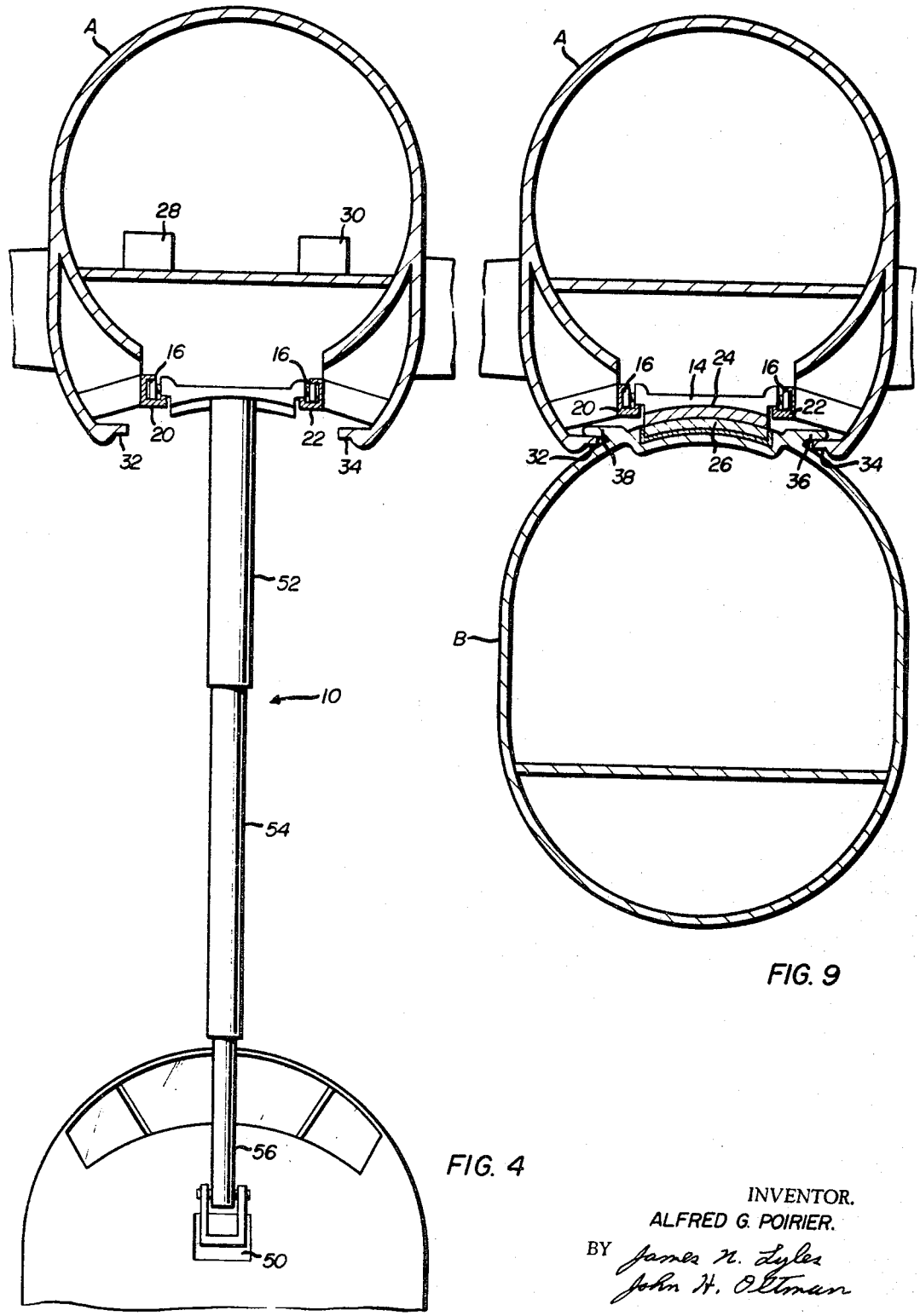

Dec. 31, 1968
A. G. POIRIER
3,419,234
AIRCRAFT RESCUE SYSTEM
Filed Sept. 19, 1967
Sheet 3 of 4
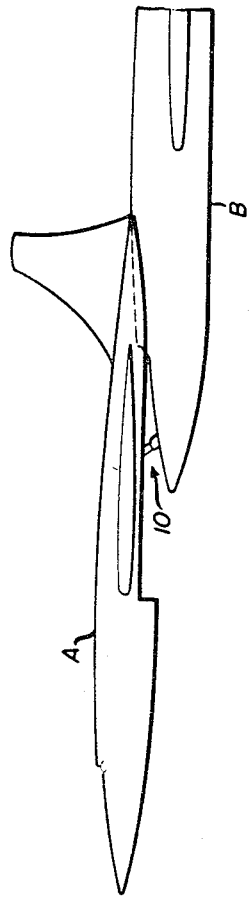
FIG. 6
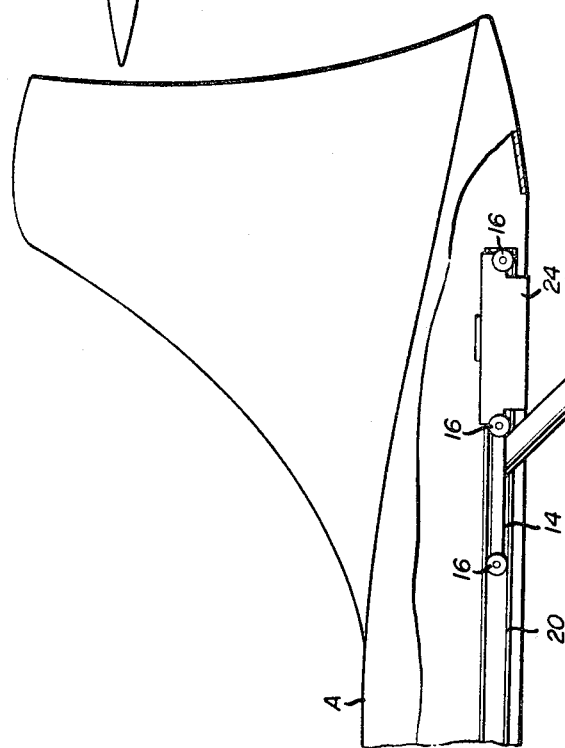
FIG. 5
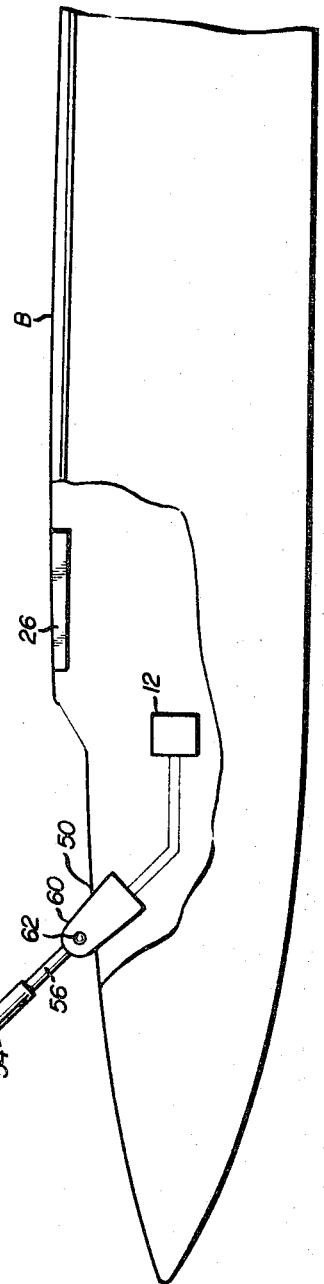
INVENTOR.
ALFRED G. POIRIER.
BY James N. Lyles
John H. Oltman
ATT'YS.

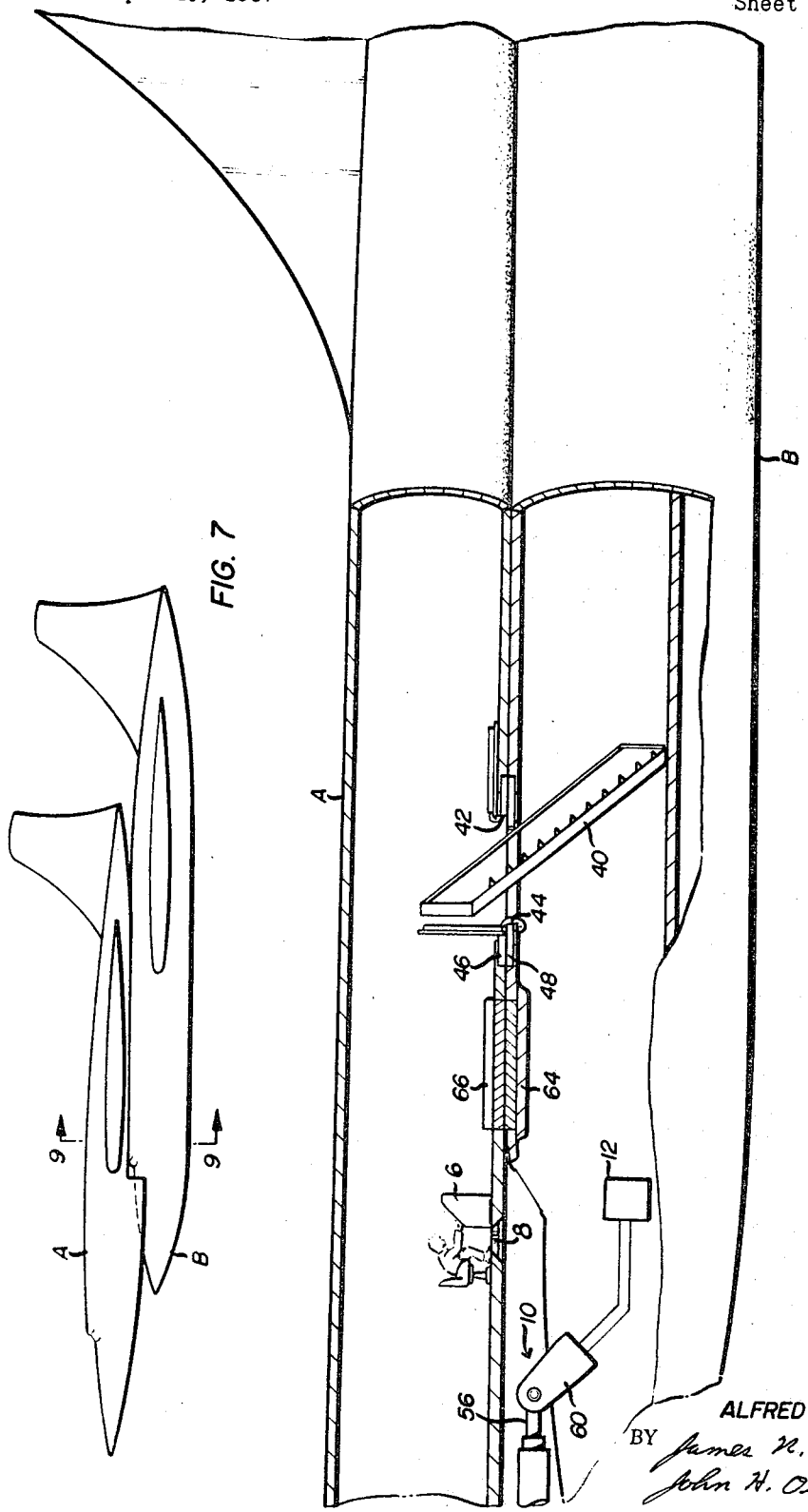

United States Patent Office

3,419,234
Patented Dec. 31, 1968

3,419,234
AIRCRAFT RESCUE SYSTEM
Alfred G. Poirier, 7960 W. Tropicana St.,
Miramar, Fla. 33023
Filed Sept. 19, 1967, Ser. No. 668,801
10 Claims. (Cl. 244—137)

ABSTRACT OF THE DISCLOSURE

The invention is an aircraft rescue system for transferring passengers from a damaged aircraft to a rescue aircraft in midair. The rescue aircraft is specially equipped to control a damaged aircraft and to allow intercoupling of the two aircraft, for transfer of passengers. Specifically, the two aircraft have coupling structure for coupling the damaged aircraft and the rescue aircraft together in flight. The coupling structure may include magnets and interlocking tracks which become engaged with each other during the rescue operation. Also included is a control system for controlling the damaged aircraft from the rescue aircraft, the control system including a boom extendable from the rescue aircraft and connectable to an autopilot system of the damaged aircraft to establish electronic communication and control paths between two aircraft. The aircraft have openings interconnectable to allow transfer of personnel from the damaged aircraft to the rescue aircraft, and the rescue aircraft has a conveyance such as steps or an escalator extendable through the openings for transfer purposes. Provisions are made for sealing the passageway formed by the openings so that pressurization may be maintained in the two aircraft.

BACKGROUND OF THE INVENTION

At the present time, when an aircraft is damaged during takeoff or while in flight, the only course available is to land the aircraft even though this might be dangerous. Parachutes for passengers are not normally carried by commercial aircraft, and bailing out would be dangerous anyway. Some way of rescuing passengers and crew from a damaged aircraft while it is in flight has been needed.

SUMMARY OF THE INVENTION

The present invention provides an aircraft rescue system through which a safe transfer of passengers from a damaged aircraft to a rescue aircraft can be accomplished with a relatively high degree of safety. All passenger aircraft would be specially equipped to effect such transfer, and a specially equipped rescue aircraft is provided to receive passengers from a damaged aircraft. In a specific system, the rescue aircraft includes a boom having control instrumentation and adapted to be coupled to the autopilot system of the damaged aircraft for controlling the damaged aircraft from the rescue aircraft. Computers may be provided on the rescue aircraft and the damaged aircraft through which the control function is accomplished. A track system is provided on the rescue aircraft, and a magnet structure is movable along this track system and engageable with a similar magnet on a damaged aircraft to effect the initial coupling of the two aircraft. This magnet structure is preferably an electromagnet energized by one or more generators in the rescue aircraft. The rescue aircraft also has an opening in its belly through which passengers may be transferred, and a conveyance such as steps or an escalator is extendable through this opening into similar openings in the damaged aircraft. A sealing structure is provided to seal the passageway between the two aircraft so that pressurization may be maintained in both aircraft.

All passenger aircraft would be provided with the following special equipment:

(1) An autopilot system controlled by a computer, and means for connecting the control boom of the rescue aircraft to the passenger aircraft;

(2) A magnet structure engageable with the magnet structure of the rescue aircraft;

(3) A track system engageable with the track system of the rescue aircraft to keep the tails of the two aircraft in alignment;

(4) An opening on the top side of the passenger aircraft registrable with the similar opening in the rescue aircraft to receive the conveyance; and (5) Means cooperable with the sealing means of the rescue aircraft for sealing the passage formed by the two openings.

Accordingly, it is an object of the present invention to provide an improved aircraft rescue system in which a specially equipped rescue aircraft may be coupled to a damaged aircraft to effect transfer of passengers and crew from the damaged aircraft ot the rescue aircraft.

Another object of the invention is to utilize magnetic structure in the coupling of the two aircraft together.

A further object of the invention is to provide a control boom on a rescue aircraft connectable to an autopilot system of a passenger aircraft allowing control of the passenger aircraft from the rescue aircraft.

Another object of the invention is to provide interengaging track systems on a rescue aircraft and on passenger aircraft for aiding in coupling the two aircraft together in an aligned relation with each other.

Another object is to provide openings in the two aircraft capable of forming a passageway through which passengers may be transferred, and sealing structure associated with the openings for sealing the passageway.

Other objects of this invention will appear in the following description and appended claims, reference being had to the accompanying drawings forming a part of this specification wherein like reference characters designate corresponding parts in the several views.

On the drawings:

FIGURE 4 is a cross sectional view of the rescue aircraft taken along line 4—4 of FIGURE 1;

FIGURE 5 is an enlarged fragmentary view of the tail portion of the rescue aircraft and the nose portion of the damaged aircraft showing a boom extended from the rescue aircraft into connection with an autopilot system of the damaged aircraft;

FIGURE 6 is a view similar to FIGURE 1, but showing the relative positions of the two aircraft after the initial contact between them has been made;

FIGURE 7 is an elevational view similar to FIGURE 6 showing the positions of the two aircraft after the damaged aircraft has moved forward to complete the intercoupling of the aircraft;

FIGURE 8 is a fragmentary sectional view showing a conveyance in the form of steps extended from the rescue aircraft into the damaged aircraft; and FIGURE 9 is a cross sectional view taken along line 9—9 of FIGURE 7.

As shown on the drawings:

As has been pointed out, the rescue aircraft A would be specially equipped for transfer of passengers from a damaged aircraft B to the rescue aircraft. The crew of the rescue aircraft A may consist of a pilot, a navigator and a flight engineer, and in addition includes two mechanics and a pilot to be transferred to the damaged aircraft B after the regular crew and passengers have been removed. The rescue crew is trained to repair the damage in flight, or alternatively to either attempt landing the damaged plane or abandon it and parachute to safety. The flight engineer in the rescue aircraft A will have full control over all personnel involved, and all flight conditions such as altitude rate of climb and speed of both aircraft will be set in accordance with his judgment.

The station of the flight engineer is in the belly of the rescue aircraft A (FIGURE 8) where a console 6 is located equipped to control not only his own aircraft, but once intercoupling between the two aircraft has been completed, he will have full control of the damaged aircraft B. Both aircraft have computors to aid in this control function, the computor of the regular passenger aircraft being a part of its autopilot system. A window 8 may be provided in the belly of the rescue aircraft A at the flight engineer's station to enable him to view the damaged aircraft to facilitate his control of the damaged aircraft.

Figure 1:
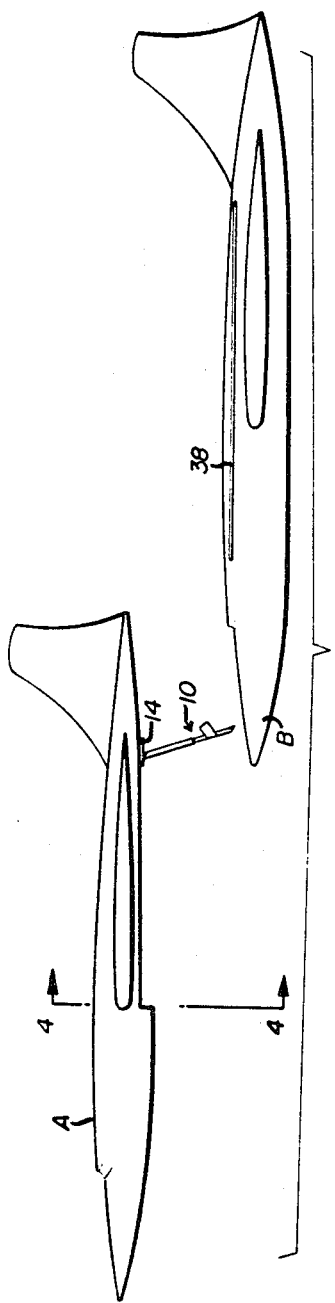
FIGURE 1 is an elevational view showing a damaged aircraft approaching a rescue aircraft at the beginning of rescue operations.

The rescue aircraft A has a control boom 10 which may be extended telescopically from the rescue aircraft A a distance of say thirty feet, and the boom 10 will be connected to the autopilot system 12 of the passenger aircraft in the manner shown in FIGURE 5. As shown in FIGURES 1 and 5, the boom 10 is suspended from a carriage 14 located on the underside of the rescue aircraft A and initially at the tail section of the rescue aircraft. As shown in FIGURES 4 and 5, the carriage 14 has wheels 16 which roll along rails 20 and 22 of the rescue aircraft A. Carriage 14 also includes a plate or block 24 of magnetic material such as steel which is movable with the carriage longitudinally of the rescue aircraft A along the tracks 20 and 22. Another plate or block 26 of magnetic material is provided in the roof of the damaged aircraft B near the pilot's compartment. As shown in FIGURE 5 as will be explained, the damaged aircraft B is maneuvered to bring the plate 26 of the damaged aircraft B into contact with the plate 24 of the rescue aircraft, and then the two plates are magnetized by power supplied from generators 28 and 30 in the rescue aircraft A as shown in FIGURE 4. This provides the initial coupling of the two aircraft together.

Figure 3:
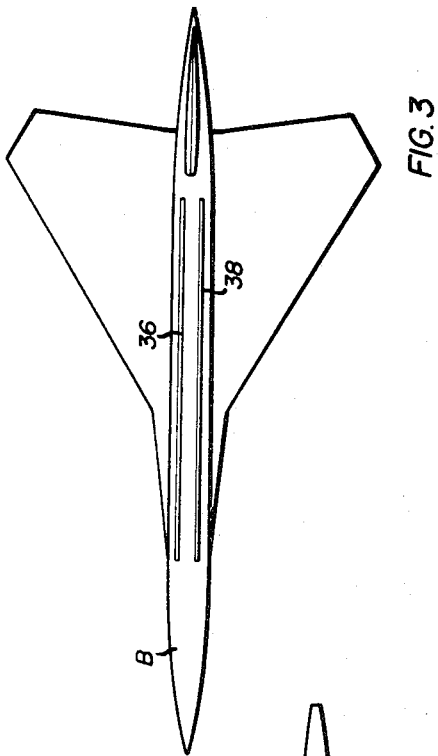
FIGURE 3 is a top plan view of the damaged aircraft showing part of its coupling structure.
Figure 2:
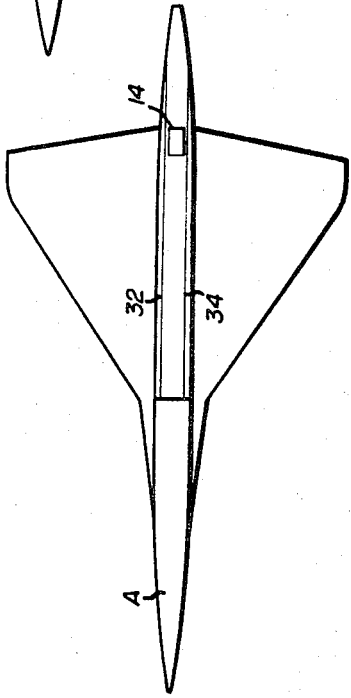
FIGURE 2 is a bottom plan view of the rescue aircraft showing part of its coupling structure.

Referring to FIGURE 2, it may be seen that the track system of the rescue aircraft A includes two rails 32 and 34 which extend longitudinally of the rescue aircraft A on its underside. It may be seen in FIGURE 3 that the passenger aircraft also has a track system which includes two rails 36 and 38 extending longitudinally of the passenger aircraft along its top side. As best shown in FIGURE 9, the rails 36 and 38 of the passenger aircraft are designed to slip over and ride along the rails 32 and 34 of the rescue aircraft A to maintain the two aircraft in alignment.

The rescue aircraft A is provided with a conveyance such as steps or an escalator, and steps 40 for this purpose are shown in FIGURE 8. Steps 40 extend through an opening 42 in the rescue aircraft A and a registering opening 44 in the passenger aircraft. Opening 42 has an annular plate structure 46 extending around it, and opening 44 has a similar annular plate structure 48 extending around it, the two plates being in contact with each other when the two openings are in registration. When the plates 46 and 48 are in contact, they may be magnetized from the generators 28 and 30 to lock them together, thus sealing the passageway 42 and 44 so that pressurization may be maintained in both the rescue aircraft A and the passenger aircraft.

For purposes of describing the rescue operation, it may be assumed that the damaged passenger aircraft has reported its damage and requested a rescue aircraft, and that the rescue aircraft A has visually contacted the damaged plane. The flight engineer of the rescue aircraft will determine the most advantageous altitude and flight path and will instruct the pilot of the damaged aircraft B to rendezvous. The planes will maneuver into the positions shown in FIGURE 1 wherein the rescue aircraft A is located above and slightly ahead of the damaged aircraft B. The boom 10 will then be lowered and guided by the flight engineer of the rescue aircraft until it is coupled to the autopilot system 12 of the damaged aircraft in the manner shown in FIGURE 5. It will be understood that an opening is provided at 50 in the passenger aircraft to accept the boom 10. Boom 10 may consist of telescoping sections 52, 54 and 56 to allow extension of the boom and also telescoping retraction of the boom as the damaged passenger aircraft B approaches closer to the rescue aircraft A.

Once the boom is connected, the flight engineer of the rescued aircraft will order the damaged aircraft to climb until contact is made between the magnetic plate 26 of the damaged aircraft and the magnetic plate 24 of the rescue aircraft. The position of the two aircraft after contact has been made is illustrated in FIGURE 6. The plates 24 and 26 are then electromagnetized by power supplied from the generators 28 and 30 (FIG. 4) to lock the two plates together. The damaged aircraft will then continue moving forward relative to the rescue aircraft so that the entire carriage 14 with the boom 10 and the magnetic plate 24 will roll forward along tracks 20 and 22 of the rescue aircraft until the two aircraft reach the positions shown in FIGURE 7. A locking device (not shown) for the carriage 14 may be provided to lock the carriage in its forward position. A pivotal member 60 is pivotally attached by a pin 62 to the end section 56 of boom 10, and member 60 may pivot as shown in FIGURE 8 as the boom 10 is retracted during closing movement of the two planes.

As the damaged plane B starts its forward movement relative to the rescue plane A, the rails 38 and 36 of plane B slip over the lips or rails 36 and 34 of the rescue aircraft in the manner shown in FIGURE 9. Rails 36 and 38 then slide along lips 36 and 34 as plane B moves forward. When the two planes have reached the position of FIGURE 9, the rails 32, 34, 36 and 38 may also be magnetized to lock them together.

The condition of the magnets 24 and 26 in the fully locked condition is also shown in FIGURE 9, and it may be seen that the two magnets 24 and 26 are in full contact with each other and are suspended from the tracks 20 and 22 by the wheels 16 of the carriage 14.

Opening 44 in the top of damaged plane B is normally closed by a sliding door 64, and opening 42 in the rescue aircraft is normally closed by another door 66. Once the planes are in the fully locked condition, doors 64 and 66 will be opened to allow the steps 40 to be extended from the rescue plane A into the damaged plane B, as shown in FIGURE 8. It may be seen in FIGURE 8 that magnetizable plate 48 of plane B is in contact with magnetizable plate 48 of plane A when the two planes are in their fully locked position. These plates are magnetized before doors 64 and 66 are opened to provide a seal around the openings so that pressurization may be maintained, as previously mentioned. Then, doors 64 and 66 are opened, and steps 40 are inserted into plane B in the manner shown in FIGURE 8.

The passengers may be lined up in the aisles of the damaged aircraft B so that when doors 64 and 66 are opened, they may file up these steps 40 into rescue aircraft A. Once the passengers have been transferred to the rescue plane, the mechanics and the pilot of the rescue crew will relieve the crew of the damaged aircraft, and the regular crew transfer to the rescue aircraft.

The separation of the two planes can then commence. Doors 64 and 66 are closed, and all of the magnetic plates and rails are demagnetized. The damaged aircraft is gradually cut in speed causing it to slip gradually back along the tracks 20 and 22 until the rails 38 and 36 slip off the end of lips 32 and 34. The rescue aircraft then starts to climb away from the damaged aircraft causing separation of the two planes. Once cleared, the rescue aircraft will proceed to a suitable landing site. The rescue crew will determine whether to land the damaged aircraft or ditch it.

Thus, the invention provides an effective rescue aircraft system in which a rescue aircraft is utilized to remove passengers from the damaged aircraft and transport them safely to a landing. Special coupling and control features are provided for assuring a safe transfer of the passengers, and it is believed that these features can be incorporated in commercial aircraft economically.

Having thus described my invention, I claim:

1. An air rescue system for transferring passengers from a first aircraft to a rescue aircraft in midair, said rescue aircraft including track means extending longitudinally along the underside of said rescue aircraft, first magnet means movable along said track means and accessible to be contacted by magnetic means of the first aircraft to couple said aircraft together, a boom extendable from said rescue aircraft and having control means therewith adapted to be coupled to autopilot means of the first aircraft for controlling said first aircraft from said rescue aircraft, means forming an opening in the underside of said rescue aircraft through which passengers may be transferred from said first aircraft to said rescue aircraft, a conveyance extendable through said opening, and means associated with said opening for sealing the same, and said first aircraft including track means extending longitudinally along the upper side thereof and engageable with said track means of said rescue aircraft, second magnet means mounted on the upper side thereof engageable with said first magnet means of said rescue aircraft, an autopilot system and means for connecting said boom to said autopilot system, means forming an opening in the upper side of said first aircraft registerable with said opening of said rescue aircraft to receive said conveyance, and means cooperable with said sealing means for sealing said openings.

2. The air rescue system as claimed in claim 1 in which said first and second magnet means are electromagnets.

3. The air rescue system as claimed in claim 2 in which said electromagnets are energizable by generator means provided in said rescue aircraft.

4. The air rescue system as claimed in claim 3 in which said first and second magnet means include magnetic metal plates engageable with each other and magnetizable by said generator means to lock said aircraft together.

5. The air rescue system as claimed in claim 1 in which said sealing means comprises first magnetizable means surrounding said opening in said rescue aircraft, second magnetizable means surrounding said opening in said first aircraft and engageable with said first magnetizable means, and generator means in said rescue aircraft for magnetizing said first and second magnetizable means.

6. The air rescue system as claimed in claim 5 in which said first and second magnetizable means comprise plates.

7. The air rescue system as claimed in claim 1 in which said conveyance comprises steps extendable from said rescue aircraft into said first aircraft through said openings.

8. The air rescue system as claimed in claim 7 in which said steps comprise an escalator.

9. The air rescue system as claimed in claim 1 in which said track means of said first aircraft and said track means of said rescue aircraft each includes a pair of rails.

10. The air rescue system as claimed in claim 9 in which said track rails of said rescue aircraft form lips directed inwardly toward each other and said track rails of said first aircraft project outwardly away from each other and are adapted to be inserted over said lips slidably thereon to allow relative motion of said aircraft in coupling the same together.

References Cited

UNITED STATES PATENTS

| | | | |
|---|---|---|---|
| 2,942,816 | 6/1960 | Dostie | 244—137 |
| 2,998,208 | 8/1961 | Di Perna | 244—2 |

MILTON BUCHLER, *Primary Examiner.*

T. W. BUCKMAN, *Assistant Examiner.*

U.S. Cl. X.R.

244—2, 139